March 6, 1962     R. D. RICE     3,024,090
METHOD OF RECOVERING AMMONIA FROM COKE-OVEN GASES
Filed April 1, 1960
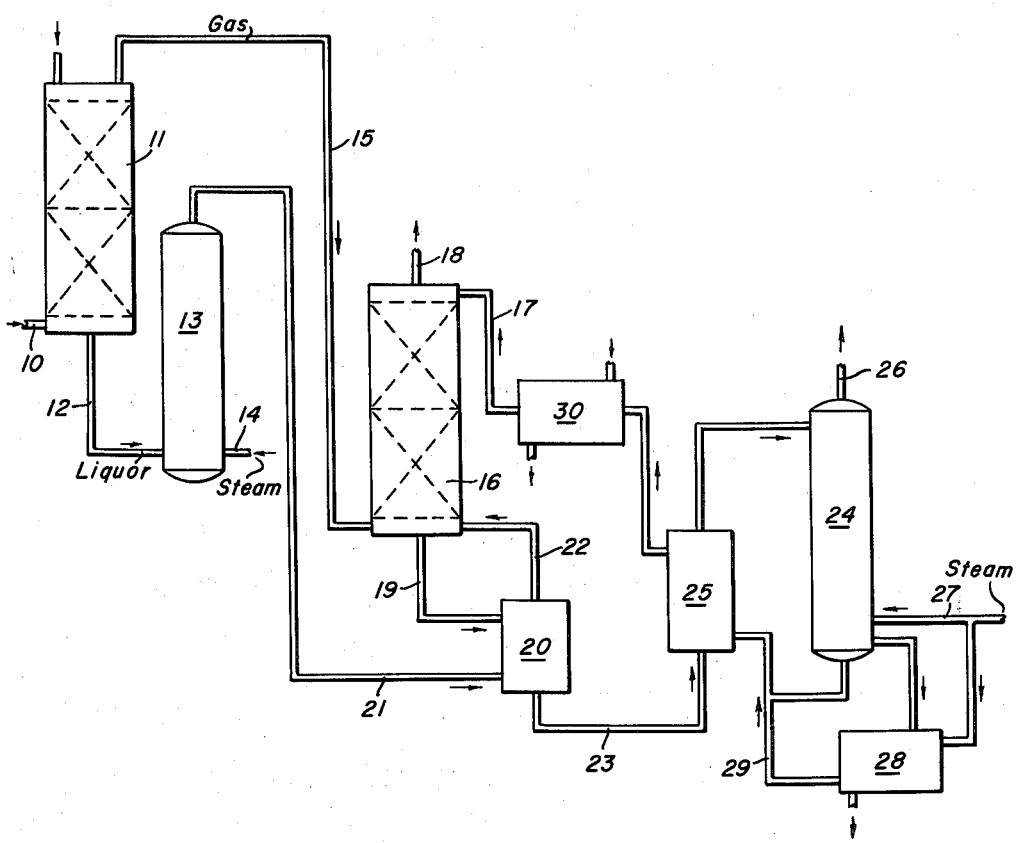
INVENTOR
ROBERT D. RICE
By Donald G. Dalton
Attorney 3,024,090
Patented Mar. 6, 1962

3,024,090
METHOD OF RECOVERING AMMONIA FROM COKE-OVEN GASES
Robert D. Rice, Monroeville, Pa., assignor to United States Steel Corporation, a corporation of New Jersey
Filed Apr. 1, 1960, Ser. No. 19,280
6 Claims. (Cl. 23—196)

This invention relates to the recovery of ammonia from coke-oven gases. In particular, it involves a method using phosphate solutions for separately absorbing the ammonia left in the gases after cooling thereof to remove ammonia liquor and the ammonia from the vapor produced by distillation of the liquor, combining the solutions and then stripping ammonia therefrom.

In conventional coke-plant practice, the aqueous liquor condensed by cooling the effluent gases, after separation from condensed tar, is rectified in an ammonia still and the vapor therefrom is mixed with the ongoing coke-oven gases for treatment in sulfuric-acid saturators. I have discovered that numerous advantages over conventional practice are obtained by scrubbing the coke-oven gases (after separation of the condensed aqueous ammoniacal liquor) with an absorbent solution of ammonia, phosphoric acid and water and then bringing the ammonia-still vapor into direct contact with the ammonia-rich absorbent solution from the scrubber. Thereafter, the amonia is stripped from the solution and collected as aqua ammonia which may be used as such or fractionated to produce anhydrous ammonia.

A complete understanding of the invention may be obtained from the following detailed description and explanation which refer to the accompanying drawing illustrating the present preferred practice. The single figure of the drawing is a diagrammatic representation of a system for carrying out the method of my invention.

Referring now in detail to the drawing, coke-oven gas is introduced by a pipe 10 to a primary cooler 11, which may be of any known type. The ammonia liquor issuing from the bottom of the cooler 11, after removal of tar in a decanter (not shown), is delivered by pipe 12 to a still 13 for rectification by steam supplied through a pipe 14. Gases from the top of cooler 11, including some ammonia gas, are conducted by a pipe 15 to the bottom of an absorber 16. The gases ascend through the absorber countercurrent to a descending spray of absorbing solution supplied to the top of the absorber by a pipe 17. The absorbing solution is composed of ammonia, phosphoric acid and water. The ammonia and acid may be represented by the formula $(NH_4)_n H_{3-n} PO_4$. The value of $n$ (the molar ratio of $NH_3$ to $H_3PO_4$ in the solution), together with the temperature and the water concentration, determines the content of ammonia in the solution and its capacity for absorbing more ammonia. In general, solutions in which $n$ is lower than 1.5 are considered as lean (in ammonia) and solutions in which $n$ is greater than 1.5 are considered as rich, for the purpose of my invention.

The coke-oven gases leave the absorber through pipe 18, substantially free of ammonia. The solution, enriched in ammonia, leaves absorber 16 through pipe 19 and enters the vessel 20. The vapor from the ammonia still 13 is conducted through pipe 21, after being compressed if necessary, and introduced into vessel 20 below the level of the solution therein. A portion of the ammonia-still vapor condenses into the solution in vessel 20, further enriching the solution in ammonia and heating it to its boiling point. The uncondensed portion of the ammonia-still vapor leaves the vessel 20 through a pipe 22 and is thereby introduced into the bottom of absorber 16. From vessel 20 the hot, ammonia-rich solution is pumped through a pipe 23 to a stripping column 24.

If the column 24 is operated at substantially atmospheric pressure, no further heating of the solution is required; if it operates at a higher pressure and temperature, the solution may be further heated before entering the column by means of heat exchanger 25. In the column 24, the solution descends countercurrent to a stream of vapor generated at the bottom, and is stripped of its absorbed ammonia thereby. The desorbed ammonia, together with water vapor, leaves the top of the column through a pipe 26. It may be used as such, or condensed to form a strong aqua ammonia solution. In either form it may be conducted to a fractionating column and enriched to any concentration desired, even to anhydrous ammonia.

The stripping vapor for column 24 may be generated by the direct injection of steam through a pipe 27 or by indirect heating in a reboiler 28 (using steam or other heating means) or by a combination of these means. The hot, lean solution flowing from the base of column 24 through pipe 29 is pumped to a cooler 30 and thereby cooled to the absorber temperature with or without the aid of exchanger 25. The lean solution is thus restored to its original condition and returns to the absorber through pipe 17 to repeat the cycle.

It will be apparent that absorber 16, vessel 20, stripping column 24 and the heat exchangers may be of any design known to effect the desired result. In particular, the absorber and stripping column are multistage gas-liquid contactors, such as packed, plate or spray towers. Preferably, the absorber is a two- or three-stage spray tower and the stripping column is a bubble-tray tower containing ten or more trays. The vessel 20 may be a low tower or a simple pot in which the vapor is bubbled through a pool of liquid. It may be built as an integral part of absorber 16, thereby eliminating the pipes 19 and 22.

The ammonia-water vapor from stripper 24 will be free of contaminants to a degree satisfactory for most purposes. If desired, however, the last traces of contaminants may be eliminated by subsequent processing, by using any one or a combination of several means. Acidic materials, for example $H_2S$, HCN, $CO_2$, and phenol, may be removed from the vapor by washing the vapor with and aqueous solution of strong alkali, or the alkali may be employed in the fractionating column to which it is introduced either with the feed or above the feed plate. The alkali may be, for example, sodium, potassium, calcium or magnesium hydroxide. Neutral oils, such as benzene, napthalene and the like, and basic oils, such as pyridine, will tend to accumulate in the central region of the fractionating column. They can be removed by drawing off a small sidestream, decanting the oil, and returning the aqueous portion to the column.

A specific example of the practice of the invention, giving quantities involved, is set forth below.

In a typical coke plant producing 100,000 s.c.f.m. of coke oven gas containing 0.8% $NH_3$ by volume, and 114 pounds per minute of ammonia-still vapor containing 10% ammonia by weight, 2000 pounds per minute of a solution containing 40% by weight of ammonium phosphate salts is used to absorb the ammonia as described above. The salts in the lean solution have the average composition $(NH_4)_{1.4} H_{1.6} PO_4$. The solution enters through pipe 17 at 45° C. The coke-oven gas enters through pipe 15 at 45° C., saturated with water at 36° C. The ammonia-still vapor enters through pipe 21 at 99° C. Under these conditions, the average temperature in the absorber 16 is about 48° C. and in the vessel 20, 98° C. The gas leaves the absorber through pipe 18 containing 0.005% $NH_3$ by volume, corresponding to a 99.5% recovery of the total ammonia, and the rich solution leaves the vessel 20 through pipe 23 containing about 40% salts of the average composition $(NH_4)_{1.9}H_{1.1}PO_4$. The rich solution is pumped directly to a 24-plate stripping column 24 operated at substantially atmospheric pressure and heated at the bottom by steam in reboiler 28. The vapor leaving the top of the stripper through pipe 26 is at 99° C. and contains 11% ammonia by weight and the balance water, with small traces of organic and inorganic contaminants. The hot, lean solution leaves the bottom of the column 24 at 103° C. through pipe 29 and contains the average salt $$(NH_4)_{1.4}H_{1.6}PO_4$$

in the concentration of approximately 40% by weight. The solution is cooled to 45° C. in the heat exchanger 25 and the cooler 30. It is then returned to the absorber.

While the above example illustrates a preferred method of operation, other conditions of operation may be used without departing from the spirit of the invention. The value of $n$ in the formula $(NH_4)_nH_{3-n}PO_4$ may range from 1.1 to 1.5 in the lean solution, and from 1.5 to 2.1 in the rich solution. The salt concentration in the lean solution may be of any value from 10% to the saturation point. The exact value of the saturation point will depend upon the value of $n$ and the temperature. For example, if $n$ equal 1.4 at 50° C., the maximum salt concentration will be approximately 60%. The absorber temperature is largely determined by the temperature and humidity of the coke-oven gas, and may be from 35 to 60° C. The absorber will operate at whatever pressure is required for the gas-processing equipment, usually only a little above atmospheric presure. The stripping column 24 may be operated at a higher pressure than atmospheric and with higher temperatures than the above. The concentration of the lean solution may be controlled in various ways. For example, water may be eliminated by the application of more heat in the stripper reboiler, by evaporation from the hot, lean solution issuing from the stripper, or by increased evaporation into the gas stream brought about by delivering the solution to the absorber at a higher temperature. Water may be introduced if the solution tends to become more concentrated, either directly into the liquid absorbent, or by the introduction of more live steam and less closed steam to the stripping column, or by cooling the lean solution to a lower temperature.

The ammonia-still vapor may be modified by the addition of coke-oven gas or any other suitable gas before contacting the solution, if desired. The effect of this modification is to increase the quantity of vapor sweeping through the rich solution in the still-vapor contactor, and thus to further reduce the amount of contaminants in the rich solution.

The invention is characterized by several distinct advantages. In the first place, since the ammonia-still vapors are much richer in ammonia than the coke-oven gas stream (which contains about 0.75% $NH_3$ by volume, whereas the ammonia-still vapors contain from 2 to 15% $NH_3$ by volume) the countercurrency of the absorption operation is greatly increased by handling them separately, as described, over what it would be if the two streams were mixed as is usual in coke-plant practice. This results in a more complete ammonia removal than would otherwise be obtained.

Secondly, the condensation of a large portion of the ammonia-still vapor in the vessel 20 produces a much drier gas stream entering the absorber. Consequently, water is evaporated from the ammonium-phosphate solution in the absorber, this process lowering the operating temperature of the absorber. Since the affinity of ammonium-phosphate solutions for ammonia is greatly increased by lowering the absorption temperature, this decrease in the absorber operating temperature results in a more complete ammonia removal than could otherwise be obtained.

If the still vapor and the gas were mixed, the water content of the mixture entering the absorber would be near saturation with respect to the phosphate solution. Consequently, any effort to cool the absorber would result mainly in the condensation of water with little change in temperature.

Thirdly, the ammonia-still vapor entering vessel 20 condenses into the ammonium phosphate solution and heats the solution to its boiling point, after which the residual vapors bubble through the boiling solution and strip it of its absorbed volatile contaminants, such as hydrogen sulfide, benzene and naphthalene. Hence, the solution leaving the vessel 20 and entering the column 24 is essentially free of constituents that would otherwise contaminate the ammonia product.

If steam were used for this purification, the process would be burdened by additional steam consumption and the steam would desorb some of the ammonia from the solution. If a portion of the vapor from the stripping column were used for this purpose, additional steam would be required to operate the column 24. In either case, the absorber would be required to absorb the recycled ammonia and to operate upon gas containing an additional quantity of water vapor.

Finally, since the solution leaves the vessel 20 at its boiling point, the necessity for heating this solution prior to stripping ammonia therefrom is greatly reduced or eliminated entirely.

Although I have disclosed herein the preferred practice of my invention, I intend to cover as well any change or modification therein which may be made without departing from the spirit and scope of the invention.

I claim:

1. A method of recovering ammonia from coke-oven gases which comprises passing said gases through a primary cooler and collecting at the bottom thereof the ammonia liquor resulting, then passing the gases from the cooler through a vessel in contact with an absorbent aqueous solution of ammonia and phosphoric acid and collecting the solution after it has been enriched with ammonia by contact with the gases, then distilling ammonia from said liquor and bringing the resulting ammonia vapor into contact with said solution then finally stripping ammonia from said solution.

2. A method as defined in claim 1, characterized by distilling the ammonia-water vapor from the stripping step in a fractionating column, removing from the fractionating column a sidestream containing vapor, condensing the vapor, decanting oils from the condensate, and returning the aqueous layer to the column.

3. A method as defined in claim 1, characterized by distilling the ammonia-water vapor from the stripping step in a fractionating column, removing a liquid sidestream from the fractionating column, decanting oils from the same, and returning the aqueous layer to the column.

4. A method as defined in claim 1, characterized by said solution just prior to stripping containing about 40% salts of the average composition $(NH_4)_{1.9}H_{1.1}PO_4$.

5. A method as defined in claim 1 characterized by collecting the enriched solution in a vessel separate from that in which the gases are passed through the absorbent solution.

6. A method as defined in claim 1, characterized by distilling the ammonia-water vapor from the stripping step in a fractionating column and adding to said fractionating column a strong alkali to eliminate traces of acidic contaminants from the ammonia.

References Cited in the file of this patent

UNITED STATES PATENTS 2,010,003    Becker _____ Aug. 6, 1935

FOREIGN PATENTS 222,587    Great Britain _____ Oct. 7, 1924